(12) United States Patent
Snowdon et al.

(10) Patent No.: US 11,483,122 B2
(45) Date of Patent: Oct. 25, 2022

(54) TIME TRANSFER USING PASSIVE TAPPING

(71) Applicant: Arista Networks, Inc., Santa Clara, CA (US)

(72) Inventors: David C. A. Snowdon, Sydney (AU); David J. Mirabito, Camperdown (AU)

(73) Assignee: Arista Networks, Inc., Santa Clara, CA (US)

( * ) Notice: Subject to any disclaimer, the term of this patent is extended or adjusted under 35 U.S.C. 154(b) by 102 days.

(21) Appl. No.: 17/006,234

(22) Filed: Aug. 28, 2020

(65) Prior Publication Data

US 2022/0069970 A1    Mar. 3, 2022

(51) Int. Cl.
*H04L 27/26* (2006.01)
*H04L 7/00* (2006.01)
*H04L 43/50* (2022.01)

(52) U.S. Cl.
CPC ............ *H04L 7/0008* (2013.01); *H04L 43/50* (2013.01)

(58) Field of Classification Search
CPC ..... H04L 43/04; H04L 67/22; H04W 56/0015
See application file for complete search history.

(56) References Cited

U.S. PATENT DOCUMENTS

| | | |
|---|---|---|
| 5,521,907 A | 5/1996 | Ennis, Jr. et al. |
| 2012/0120834 A1* | 5/2012 | Sugar .................... G01S 5/0221 370/252 |
| 2013/0315265 A1 | 11/2013 | Webb et al. |
| 2017/0141943 A1* | 5/2017 | Nazarathy ............. H04L 1/0071 |
| 2018/0048554 A1* | 2/2018 | Huang ............. H04W 56/0015 |

FOREIGN PATENT DOCUMENTS

| | | |
|---|---|---|
| EP | 1646183 A1 | 4/2006 |
| EP | 1936867 A1 | 6/2008 |

OTHER PUBLICATIONS

International Searching Authority, International Search Report and Written Opinion dated Dec. 6, 2021 for corresponding PCT Application No. PCTUS2021046306 filed Aug. 17, 2021, 14 pages.

* cited by examiner

*Primary Examiner* — Jamal Javaid

(57) ABSTRACT

Techniques for determining a clock offset between monitoring devices in a network. Such techniques include: obtaining, by a first monitoring device, a first set of network traffic data units sent between a first endpoint and a second endpoint via a first tap on a network link between the first endpoint and second endpoint; obtaining, by a second monitoring device, a second set of network traffic data units sent between the first endpoint and the second endpoint via a second tap on the network link; calculating the clock offset between the first monitoring device and the second monitoring device using the first set of network traffic data units and the second set of network traffic data units; and performing an offset action based on the clock offset.

19 Claims, 6 Drawing Sheets

TIME TRANSFER USING PASSIVE TAPPING

BACKGROUND

Devices within and/or operatively connected to a network often transmit and receive network traffic data units (e.g., packets). It is often useful to understand information about the time that such transmissions and receipts occur. For example, it may be useful to synchronize the clocks of sending and receiving devices, or time monitoring devices attached to sending/receiving devices, in order to understand the order in which events in a network happened. Various schemes exist for clock synchronization (e.g., Precision Time Protocol (PTP), Network Time Protocol (NTP), etc.). However, such protocols may be limited to time synchronization that is insufficient for certain situations. Additionally, such protocols use in-band exchanges of information, which may negatively impact bandwidth available for other network traffic not related to clock synchronization.

DETAILED DESCRIPTION

Figure 1A:
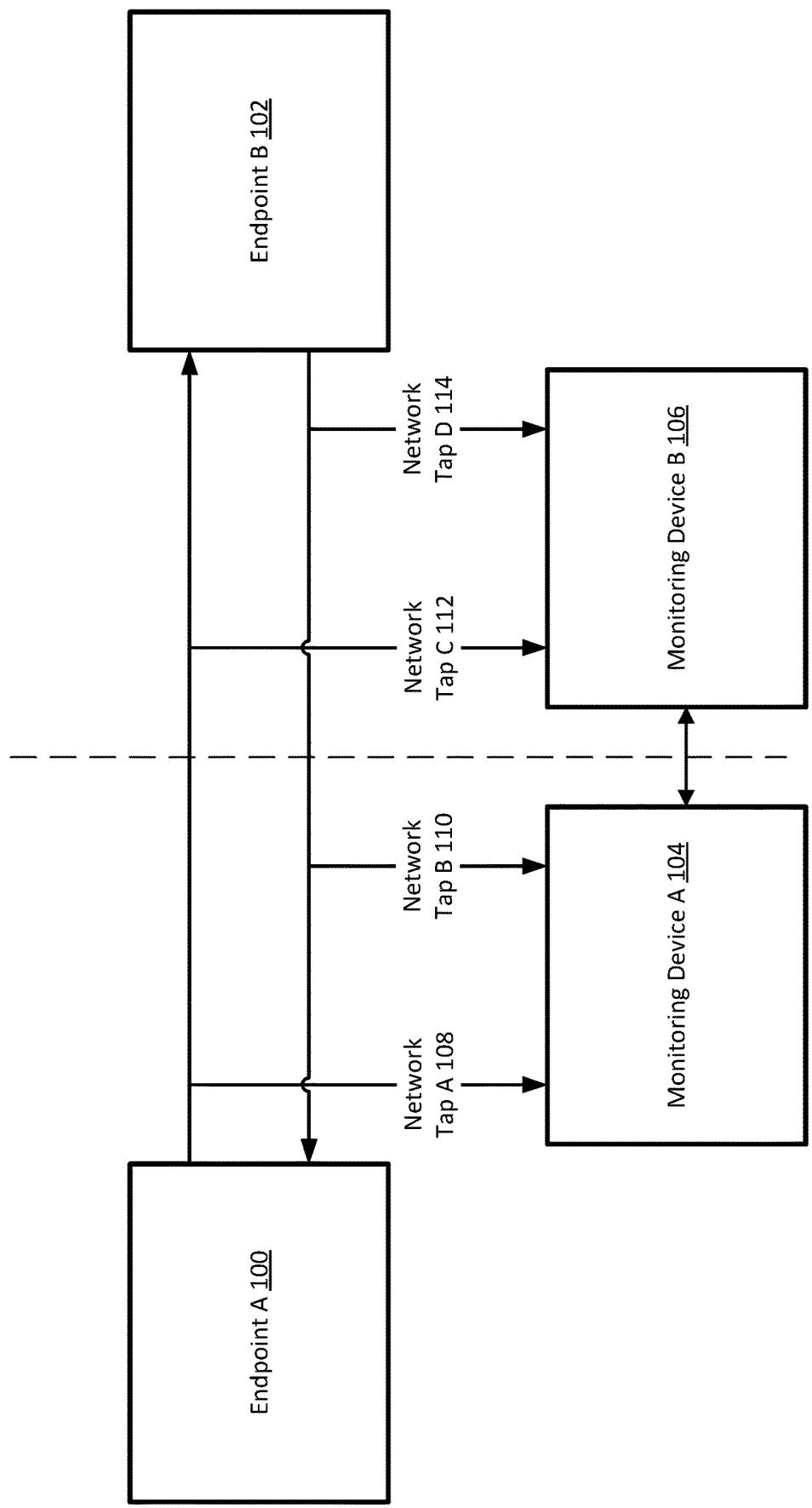
FIG. 1A shows a system in accordance with one or more embodiments described herein.

Specific embodiments will now be described with reference to the accompanying figures.

In general, embodiments described herein relate to techniques for determining an offset between the clocks of at least two monitoring devices (e.g., devices capable of monitoring network traffic and accurately timestamping times at which network traffic data units are received). In one or more embodiments, knowing the offset between two monitoring devices is advantageous because it allows a user (e.g., network administrator) to accurately be able to know the time at which events in a network occurred. For example, it is useful to know that if an event (e.g., a packet is sent) happens at a first device at a first location, a subsequent event (e.g., the packet arrives) that occurs at a second device at a second location is timestamped in a manner that allows a user to determine the actual order of events. Additionally, knowing the offset may be used to synchronize the two clocks (e.g., via frequency adjustment of an oscillator of at least one of the clocks) so that timestamps measured by each can be compared.

Moreover, existing methods of clock synchronization generally use technologies such as NTP or PTP, which operate using packet exchange schemes where the devices ping each other over a real connection, and go through a packet exchange process to estimate delay. Such schemes may be problematic, as tighter time synchronization may be desired than such schemes allow, and more packets must be exchanged, potentially negatively affecting bandwidth available for other network traffic. Additionally, it may not be possible to obtain dedicated access to a direct link due to reliability or security concerns. Embodiments described herein may overcome such problems by tapping links between network devices, and accurately timestamping network traffic data units via the taps. Such timestamps may be used (as is described in detail below) to determine clock offset without the need to engage in an in-band packet exchange as is used in existing time synchronization schemes. Other advantages may include, but are not limited to, transferring time data between monitoring devices other than endpoints from which network traffic is being transmitted and/or received, passive tapping of links of such endpoint, a high degree of accuracy of calculated clock offset, and the ability to send time information out-of-band to calculate offsets and take actions based thereon.

One or more embodiments described herein solve the above-recited and other problems by passively or actively tapping endpoint links at two ends of a bidirectional link. In one or more embodiments, at a first endpoint, a first monitoring device is connected to a tap of a link of a first endpoint. In one or more embodiments, at the other endpoint, a second monitoring device is connected to a tap of a link of a second endpoint that is connected to the link of the first endpoint.

Next, in one or more embodiments, a network traffic data unit is sent from the first endpoint and is captured by the first endpoint via the tap. In one or more embodiments, a unique identifier of the network traffic data unit (e.g., a hash, a known-unique portion of the network traffic data unit, etc.) is created by the first monitoring device and stored with the timestamp of arrival of the network traffic data unit at the first monitoring device, which may be referred to as an associated information item.

In one or more embodiments, sometime later, the network traffic data unit arrives at the second endpoint, where a copy is captured by the second monitoring device via its tap. In one or more embodiments, the second monitor repeats the aforementioned process, creates a unique identifier of the network traffic data unit (which should be the same as the unique identifier created by the first monitoring device) and stores it with a timestamp indicating arrival time at the second monitoring device. In one or more embodiments, the two monitoring devices then exchange their respective stored data with one another via any communication channel or operative connection (e.g., an out of band communication channel, the Internet, etc.). In one or more embodiments, having the same unique identifier allows each monitoring device to match the associated information item received from the other monitoring device with its own associated information item, thereby obtaining a pair of timestamps for the first network traffic data unit.

Next, the process is repeated for a second network traffic data unit sent in the opposite direction (i.e., from the second endpoint to the first endpoint) on the bidirectional connection. In one or more embodiments, the second network traffic data unit is sent at a time relatively close to the time at which the first network traffic was transmitted. However, there may exist scenarios in which there is a relatively large time difference (e.g., several seconds) between the transmission/receipt of the first and second network traffic data units.

In one or more embodiments, once the above described process is complete, each monitoring device has four items of information in two pairs (i. e., one pair for each of the two network traffic data units transmitted between the two endpoints).

In one or more embodiments, with the four items of information (which include four timestamps), from the perspective of a given monitoring device, a calculation of clock offset from the clock of the other monitoring device can be performed. In one or more embodiments, the calculation, which is derived from the series of events and collected timestamps, includes subtracting the timestamp of when the first packet arrived at the second clock from the timestamp of when the first packet arrived at the first clock, and subtracting the timestamp of when the second packet arrived at the first clock from the timestamp of when the second packet arrived at the second clock. These two results are subtracted from one another, and the result is divided by two, yielding a clock offset.

In one or more embodiments, such a process is performed using the actual timestamps, in instances where the network traffic data units were transmitted relatively close in time. However, in one or more embodiments, if the time of transmission is higher, it may be an improvement to perform an additional statistical analysis to obtain the four timestamps to be used in the aforementioned calculation. For example, statistical methods such as interpolation or linear regression may be used to obtain virtual timestamps for the second network traffic data unit, which may be used in the calculation in place of the timestamps for the second network traffic data unit. In one or more embodiments, such time-series analyses may account for clock drift that may have occurred between the time of transmission of the first network traffic data unit and the time of transmission of the second network traffic data unit.

As an example, the equation for calculating clock offset may be:

$$\text{offset} = \frac{1}{2}((XB-XA)-(YC-YD))$$

In such an example, X is the first network traffic data unit, and was sent from the first endpoint to the second endpoint. Y is the second network traffic data unit, and was sent from the second endpoint to the first endpoint. A is the timestamp of the first packet at the first monitoring device, and B is the timestamp of the first network traffic data unit at the second monitoring device. C is the timestamp of the second network traffic data unit at the first monitoring device, and D is the timestamp of the second network traffic data unit at the second monitoring device.

In one or more embodiments, the offset may be used to understand the times at which events occur in a network, and/or to synchronize the clocks of the monitoring devices. The clocks of the monitoring devices may be synchronized by using the offset to adjust the frequency of one or both of the clocks to align the clocks over time, with the offset being recalculated and the adjustment of frequency happening on an on-going basis. Additionally, or alternatively, the offset data may be stored for use when analyzing the time at which events occurred, even where the clock frequencies are not being adjusted. In either scenario, the offset may be repetitively calculated over time. This may allow for continual adjustment of the clock frequencies, and/or the offsets being used to create a database of offsets at given times.

Additionally, in one or more embodiments, some network traffic data unit streams may transmit too many packets for the clocks to sample every packet. In such scenarios, a scheme to select a subset of the network traffic data units may be used. In one or more embodiments, a monitoring device may be configured to identify and/or use network traffic data unit types that occur frequently enough (e.g., a lower threshold) to allow the time offset calculations described herein to be performed, but that occur less frequently than is needed for such time calculations (e.g., a threshold beyond which the monitoring device is unable to process network traffic data units and generate timestamps in a timely manner). For example, the scheme could be configured to only use network traffic data unit of a given protocol (e.g., address resolution protocol (ARP)), or having a specific virtual local area network identifier (VLAN ID). One having ordinary skill in the art will appreciate that any other scheme of identifying a subset of network traffic data units may be used without departing from the scope of embodiments described herein.

Additionally, in one or more embodiments, the above-described offset derivation assumes a symmetric link (e.g., the delay time from A to B is the same as from B to A). In one or more embodiments it is also assumed that the tapping and timestamping process can determine the amount of time from when the network traffic data unit was obtained from the tap until the information related to the network traffic data unit was recorded. In one or more embodiments, the delay between the tapping point and the actual timestamp being applied need to be calculated, otherwise asymmetry may be introduced. If such assumptions are untrue, in one or more embodiments, there may need to be some other form of calibration to account for the asymmetry of transmission times on a given connection.

FIG. 1A shows a system in accordance with one or more embodiments described herein. The devices/components shown in FIG. 1A and described below are each only one example of a particular device/component. One having ordinary skill in the art, and the benefit of this Detailed Description, will appreciate that the techniques described herein may apply to any number of different devices. Accordingly, embodiments described herein should not be considered limited to devices shown in FIG. 1A.

As shown in FIG. 1A, the system includes endpoint A (100), endpoint B (102), monitoring device A (104) and monitoring device B (106). Each of these components is described below.

In one or more embodiments, endpoint A (100) and endpoint B (102) are each any device capable of sending and/or receiving network traffic data units (e.g., IP packets, MAC frames, VXLAN frames, etc.), such as a computing device (described below). In one or more embodiments, endpoint A (100) and endpoint B (102) are computing devices. In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM) (not shown)), input and output device(s) (not shown), persistent storage, one or more physical interfaces (e.g., network ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described below, a virtual machine executing using underlying hardware components of a physical computing device, and/or any other type of computing device with the aforementioned requirements.

In one or more embodiments, one type of a computing device as described herein is a network device. In one or more embodiments, a network device is a physical device that includes and/or is operatively connected to persistent storage (not shown), memory (e.g., random access memory (RAM)) (not shown), one or more processor(s) (e.g., integrated circuits) (not shown), and at least one physical network interface (not shown). Examples of a network device include, but are not limited to, a network switch, a router, a multilayer switch, a fibre channel device, an InfiniBand® device, etc. A network device is not limited to the aforementioned specific examples.

In one or more embodiments, a network device also includes any number of additional components (not shown), such as, for example, network chips, field programmable gate arrays (FPGAs) (not shown), application specific integrated circuits (ASICs) (not shown), indicator lights (not shown), fans (not shown), etc.

In one or more embodiments, a network device includes any software configured to perform various functions of the network device. Such software may, for example, execute using one or more processors (including circuitry therein) of a network device, or any other hardware resource of a network device capable of executing software. One example of such software is an operating system (OS) (not shown). In one or more embodiments disclosed herein, an OS includes any software and/or firmware for managing the resources (e.g., hardware, other software, etc.) of one or more network devices.

More specifically, an OS may be a program or set of programs that manages all or any portion of the other software (e.g., applications, agents, etc.) in a network device, as well as all or any portion of the hardware of a network device. Management by an OS may include scheduling, hardware allocation, application execution, network access, management of access to stored files that are selectively made available to applications running on the OS, etc. An OS may also manage and enforce settings and permissions customized for specific applications running within the OS.

In one or more embodiments, a network device includes functionality to send and/or receive network traffic data units (e.g., frames, packets, tunneling protocol frames, etc.) at any of the physical network interfaces (i.e., ports) of the network device and to process the network traffic data units. In one or more embodiments, processing a network traffic data unit includes, but is not limited to, a series of one or more table lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Such a series of lookups and corresponding actions may be referred to as a pipeline, and may be, for example, programmed as a match-action pipeline. Examples of pipeline processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device.

In one or more embodiments, the network device is part of a network (not shown). A network (not shown) may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. A network may be located at a single physical location, or be distributed at any number of physical sites.

In one or more embodiments, a network may be coupled with or overlap, at least in part, with the Internet. In one or more embodiments, a network includes a collection of one or more network devices (e.g., endpoint A (100), endpoint B (102)) that may facilitate network connectivity for one or more operatively connected devices (e.g., other computing devices, data storage devices, other network devices, etc.) (not shown). In one or more embodiments, the network devices and other devices within the network are arranged in a network topology (not shown). In one or more embodiments, a network topology is an arrangement of various devices of a network.

In one or more embodiments, the persistent storage (which may be or include non-volatile storage device) and/or memory (which may be or include volatile storage device) of the endpoints (100, 102) may be or include one or more data repositories for storing any number of data structures storing any amount of data (i.e., information). In one or more embodiments, a data repository is any type of storage unit and/or device (e.g., a file system, database, collection of tables, RAM, and/or any other storage mechanism) for storing data. Further, the data repository may include multiple different storage units and/or devices. The multiple different storage units and/or devices may or may not be of the same type or located at the same physical location.

In one or more embodiments, the persistent storage and/or memory of the endpoints (100, 102) may be considered, in whole or in part, as non-transitory computer readable mediums storing, at least in part, software and/or firmware.

Such software and/or firmware may include instructions which, when executed by the one or more processors (not shown) or other hardware (e.g. circuitry) of the endpoints (100, 102), cause the one or more processors and/or other hardware components to perform operations in accordance with one or more embodiments described herein.

Such software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium.

In one or more embodiments, each endpoint (100, 102) is operatively connected to any number of monitoring devices (e.g., monitoring device A (104), monitoring device B (106)). In one or more embodiments, a monitoring device (104, 106) is any device that includes, but is not limited to, functionality to: receive network traffic data units from any number of passive taps of links of endpoints (100, 102); accurately timestamp the time of receipt, create a unique identifier (e.g., a hash) of the network traffic data unit; store timestamps and associated unique identifiers as associated information items; communicate with other monitoring devices to send and/or receive such associated information items; use associated information items to determine an offset from a clock of another monitoring device; and/or take one or more actions based on a calculated offset.

In one or more embodiments, a monitoring device (104, 106) is a computing device (described above), which, as discussed above, may be, in whole or in part, a network device (described above). In one or more embodiments, a monitoring device (104, 106) includes functionality to receive network traffic data units from tapped links of endpoints (100, 102), to timestamp the time of receipt of network traffic data units, to create unique identifiers associated with the network traffic data units, to communicate with other monitoring devices to transmit and/or receive associated information items with such timestamps and unique identifiers, and/or to perform clock offset calculations using such associated information items. Monitoring devices are discussed in greater detail in the description of FIG. 1B, below.

In one or more embodiments, a monitoring device (e.g., 104, 106) includes functionality to receive network traffic data units from any number of network taps (e.g., network tap A (108), network tap B (110), network tap C (112), network tap D (114)), which are shown in FIG. 1A as the connections between endpoints (100, 102) and monitoring devices (104, 106). In one or more embodiments, a network tap (108, 110, 112, 114) is a hardware device (e.g., an optical or electrical device) that is connected on a communication channel between two endpoints (100, 102) and includes functionality to copy information (e.g., network traffic data units) transmitted therein to be sent to a third party device (e.g., monitoring device A (104), monitoring device B (106)). In one or more embodiments, such network taps may be referred to as passive taps, which may be taps that do not interfere with the transmission of information between endpoints. In one or more embodiments, although FIG. 1A shows network tap A (108) and network tap B (110) as separate taps, they may be the same tap of a link of endpoint A (100). Similarly, although FIG. 1A shows network tap C (112) and network tap D (114) as separate taps, they may be the same tap of a link of endpoint B (102).

In one or more embodiments, a monitoring device (104, 106) includes functionality to take an action when one or more offset calculations have completed. In one or more embodiments, one such action is to record (i.e., store) the calculated offset, with or without the timestamps used to make the offset calculation. In one or more embodiments, storing offset values over time creates a time series database of such offsets, which may be used, for example, in virtual timestamp calculations (discussed below). In one or more embodiments, stored offset values may also be used during analyses of network event timing without necessarily having to adjust the clocks of monitoring devices (104, 106).

Additionally, or alternatively, offset values may be used to synchronize the clocks of monitoring devices (104, 106). Such synchronization may be achieved by adjusting the oscillator frequency of the clock devices of one or both of the monitoring devices for which the offset was calculated. Such frequency adjustments may occur in response to all or any portion of a series of calculated offsets. As an example, a monitoring device at a first site may have a clock associated with a global positioning system (GPS), and thus be considered to reflect an accurate representation of time. A second monitoring device may be at a different site that has no GPS device. In such a scenario, the frequency of the oscillator of the clock device of the second monitoring device may be increased or decreased to align the clock of the second monitoring device with that of the first monitoring device over time. Such adjustment may be performed in response to each consecutive offset calculation, thereby keeping the clocks synchronized relative to each other.

In one or more embodiments, a given endpoint and monitoring device may be located at a same site (e.g., datacenter) as another endpoint and monitoring device. Additionally, or alternatively, the two pairs of devices may be located at different sites (e.g., different data centers), which is the embodiment represented in FIG. 1A by the dashed line in the center, which is intended to represent a site separation.

While FIG. 1A shows a configuration of components, other configurations may be used without departing from the scope of embodiments described herein. For example, there may be any number of endpoints, each with any number of links being tapped by any number of monitoring devices. As another example, an endpoint and a monitoring device may be part of the same device. Accordingly, embodiments disclosed herein should not be limited to the configuration of components shown in FIG. 1A.

Figure 1B:
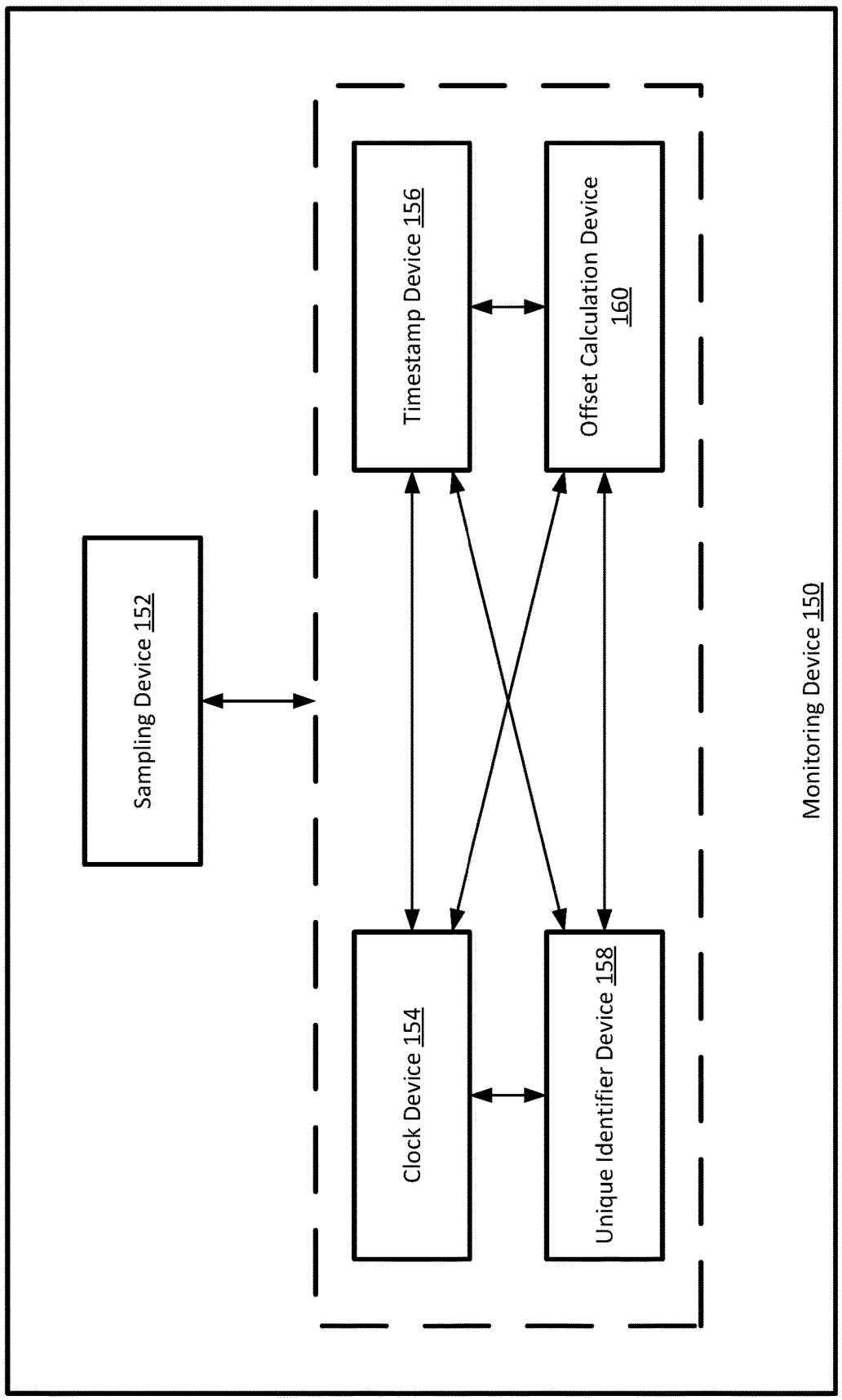
FIG. 1B shows a monitoring device in accordance with one or more embodiments described herein.

FIG. 1B shows a monitoring device (e.g., 104, 106 of FIG. 1A) in accordance with one or more embodiments described herein. The devices/components shown in FIG. 1B and described below are each only one example of a particular device/component. One having ordinary skill in the art, and the benefit of this Detailed Description, will appreciate that the techniques described herein may apply to any number of different devices/components. Accordingly, embodiments described herein should not be considered limited to monitoring device (150) shown in FIG. 1B. Additionally, each monitoring device shown in FIG. 1A may include all or any portion of the components described below as part of monitoring device (150) of FIG. 1B.

As shown in FIG. 1B, monitoring device (150) includes clock device (154), timestamp device (156), unique identifier device (158), offset calculation device (160), and sampling device (152). Each of these components is described below.

In one or more embodiments, to perform at least a portion of the aforementioned functionality of a monitoring device, monitoring device (150) includes clock device (154). In one or more embodiments, clock device (154) includes any hardware component or set of hardware components (e.g., including circuitry) that is capable of tracking time at any time scale. For example, such a hardware component may be and/or include an oscillator that oscillates at a specific frequency (e.g., when electricity is applied). In one or more embodiments, the frequency of such oscillations (e.g., clock speed) may be the shortest period of time that a device may use as a clock cycle. Such frequencies may allow for any level of time accuracy, depending on the hardware component. For example, frequencies may be possible in the sub-nanosecond range (e.g., down to an femtosecond range). In one or more embodiments, clock device (154) includes additional hardware capable of measuring, at least in part, using the oscillator frequency, the amount of time that has passed from a certain time in the past. For example, time may be divided into epochs, which have a defined starting point, and the number of time units (e g., nanoseconds) that have passed since the beginning of a given epoch, including possible adjustments (e.g., for leap seconds), may be measured by clock device (154).

In one or more embodiments, monitoring device (150) includes timestamp device (156) operatively connected to clock device (154). In one or more embodiments, timestamp device (156) is any hardware (e.g., circuitry), software, firmware, or any combination thereof that includes functionality to record and store timestamps in storage of monitoring device (150). In one or more embodiments, timestamp device (156) includes functionality to make a determination, using at least clock device (154), of the current time relative to the beginning of an epoch. In one or more embodiments, timestamp device (156) records such timestamps in storage (not shown) of monitoring device (150). Such a timestamp may be associated with the time of receipt of a network traffic data unit. Such a timestamp may be recorded, for example, by storing a series of binary bits that represent the time value at which a network traffic data unit was received at monitoring device (150). In one or more embodiments, the series of binary bits may include any number of bits, with more bits representing the capability for storing more precise timestamps. For example, a timestamp created by a timestamp device may include enough bits to record the time in a sub-nanosecond range.

In one or more embodiments, monitoring device (150) includes unique identifier device (158) operatively connected to clock device (154), timestamp device (156), and offset calculation device (160). In one or more embodiments, unique identifier device (158) is any hardware (e.g., circuitry), software, firmware, or any combination thereof that includes functionality to create a unique identifier based on any information within and/or associated with a network traffic data unit.

For example, unique identifier device (158) may use a network traffic data unit, or any portion thereof, to create a unique identifier of the network traffic data unit. Examples of unique identifiers include, but are not limited to, a hash of any or all of a set of information, a known-unique set of data (e.g., one or more tuples) included in or based on a network traffic data unit, etc. In one or more embodiments, a unique identifier generated by unique identifier device (158) may be stored by monitoring device (150) in any included and/or operatively attached storage, and be associated with a corresponding timestamp to create an associated information item. In one or more embodiments, a unique identifier of a network traffic data unit calculated at one monitoring device will match the unique identifier of the same network traffic data unit when received at a second monitoring device, thereby allowing each monitoring device to match unique identifiers to create associated information items.

In one or more embodiments, monitoring device (150) includes any number of communication interfaces (not shown) for communicating with other monitoring devices via any type of operative connection(s). Such communication may allow a given monitoring device to transmit associated information items to other monitoring devices, and to receive associated information items from other monitoring devices, which may be stored in storage of the receiving monitoring device. In one or more embodiments, such exchanges of associated information items may occur at any time using any form of communication. For example, they may be communicated via a direct or indirect out-of-band operative connection between two monitoring devices (e.g., using the Internet, in-band over the tapped link, etc.).

In one or more embodiments, monitoring device (150) includes offset calculation device (160). In one or more embodiments, offset calculation device (160) is any hardware (e.g., circuitry), software, firmware, or any combination thereof that includes functionality to calculate an offset between the time that a given monitoring device (e.g., 150) has as the time and a time that a remote monitoring device has as the time. In one or more embodiments, offset calculation device (160) performs such offset calculations using a set of associated information items.

For example, offset calculation device (160) may use two pairs of associated information items. One pair may include the timestamp at which a network traffic data unit was received by a first monitoring device after being sent from a first endpoint and a timestamp at which the network traffic data unit was received by a second monitoring device upon arrival at a second endpoint. In one or more embodiments, the second pair used by the calculation device is a similar set of information associated with a network traffic data unit that was transmitted in the opposite direction (e.g., from the second endpoint to the first endpoint). Details of the use of two associated information item pairs to calculate an offset is discussed in greater detail in the description of FIG. 2A, below.

In one or more embodiments, the second pair includes the actual timestamps associated with the relevant network traffic data unit. Additionally, or alternatively, the second pair may include virtual timestamps that are calculated by offset calculation device (160). In one or more embodiments, if enough time passes between the transmission of a network traffic data unit from a first endpoint to a second endpoint, the clocks of the monitoring devices may have drifted further in time from one another. In such a scenario, the possibility of clock drift may be ignored, which may lead to an error in the calculated offset. Alternatively, offset calculation device (160) may perform additional calculations to adjust the timestamp values of the second associated information item pair.

For example, a given monitoring device (e.g., 150) may store in any form of data structure (not shown) (e.g., a database, a table, etc.) a history (e.g., a set of time series values) of calculated clock offsets and/or a history (e.g., a set of time series values) of associated information items from another monitoring device. In one or more embodiments, such information may be used to calculate virtual timestamps for the second associated information item pair that represent what the timestamps would have been if the two network traffic data units had been transmitted/received relatively closer in time than actually occurred. Such a calculation may be made, for example, using interpolation, linear regression, etc. One having ordinary skill in the art will recognize that any other form of statistical analysis may be used to calculate the aforementioned virtual timestamps of the second pair used in the offset calculation of offset calculation device (160).

In one or more embodiments, monitoring device (150) includes sampling device (152) that is operatively connected to any or all of clock device (154), timestamp device (156), unique identifier device (158), and/or offset calculation device (160). In one or more embodiments, sampling device (152) is any hardware (e.g., circuitry), software, firmware, or any combination thereof that includes functionality to select and/or generate an appropriate number of the network traffic data units for use in offset calculation(s) by monitoring device (150). In one or more embodiments, an appropriate number of network traffic data units is a quantity that includes enough network traffic data units to perform an accurate offset calculation, but is less than a quantity that components of monitoring device (150) are able to effectively process to calculate offsets.

In one or more embodiments, the rate of network traffic data units being transmitted and received on a given link between two endpoints may be low enough that it is possible to use all network traffic data units, in which case sampling device (152) may sample all network traffic data units on such a link. In other scenarios, the rate may be too low to effectively and accurately calculate offsets, in which case sampling device (152) may include functionality to inject network traffic data units into the link to address the deficiency. In still other scenarios, the rate of network traffic data units on the link may be too high for the components of monitoring device (150) to process, or too high to be useful in the desired level of offset calculation(s). In still another scenario, sampling device (152) includes functionality to select only a portion of the network traffic data units received via a network tap for use in offset calculation(s). For example, sampling device (152) may only select address resolution protocol (ARP) packets, frames with a certain virtual local area network (VLAN) identifier, network traffic data units having certain items of information in common, etc. Other schemes for identifying a subset of network traffic data units may be used without departing from the scope of embodiments described herein.

While FIG. 1B shows a configuration of components, other configurations may be used without departing from the scope of embodiments described herein. For example, there may be any number of clock devices, timestamp devices, unique identifier devices, offset calculation devices, and/or sampling devices. Accordingly, embodiments disclosed herein should not be limited to the configuration of components shown in FIG. 1B.

Figure 2A:
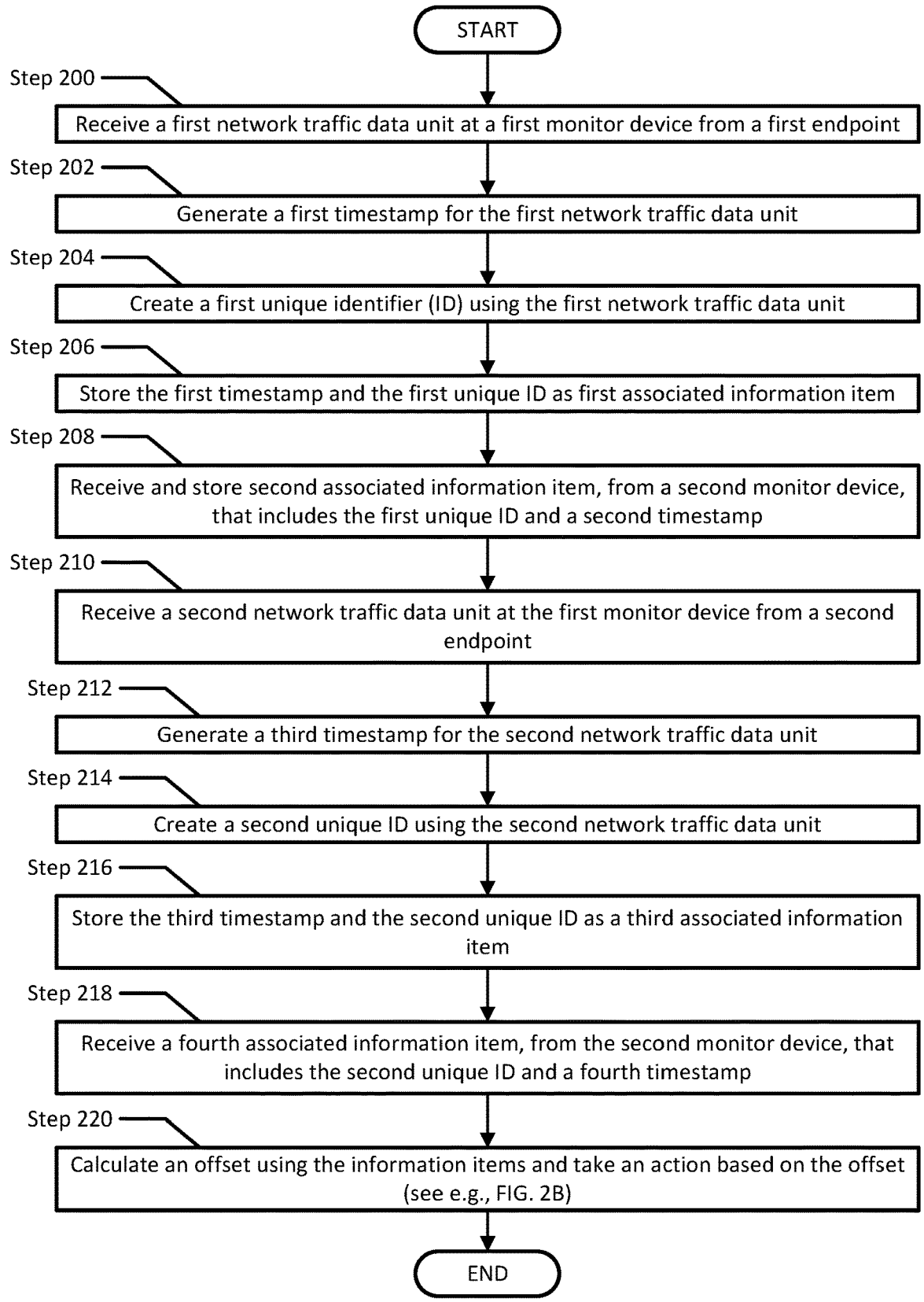
FIG. 2A shows a flowchart in accordance with one or more embodiments described herein.

FIG. 2A shows a flowchart describing a method for performing time transfer using passive tapping. The method for such time transfer shown in FIG. 2A is only one example of a particular scheme for time transfer using passive tapping. Accordingly, embodiments described herein should not be considered limited to the passive tapping scheme and use shown in FIG. 2A.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, that some or all of the steps may be executed in parallel, that certain steps may be performed closer or farther from one another in time, and/or that other steps than what is shown in FIG. 2A may be performed in accordance with embodiments described herein.

In Step 200, a first network traffic data unit is received at a first monitoring device from a first endpoint. In one or more embodiments, a passive tap exists for a link of the first endpoint. In one or more embodiments, the tap copies a network traffic data unit being sent from the first endpoint to the second endpoint, and the copy is provided to the first monitoring device via the tap.

In Step 202, the first monitoring device generates a timestamp that indicates the time at which the first network traffic data unit arrived at the first monitoring device. In one or more embodiments, the timestamp is a representation of the time as known by the clock device of the first monitoring device. In one or more embodiments, the time is a time as measured from the beginning of an epoch, such as an epoch of Unix time, which may measure the current Universal Coordinated Time (UTC). In one or more embodiments, the resolution of the timestamp is based on the oscillation frequency of an oscillator of the clock device of the first monitoring device. As such, the higher the frequency, the greater the resolution of time that can be obtained. As an example, an oscillator with a high enough frequency may be able to measure time in a sub-nanosecond range.

In Step 204, the first monitoring device creates a first unique identifier using the first network traffic data unit. In one or more embodiments, the first unique identifier is a hash of all or any portion of the data included in the first network traffic data unit. In one or more embodiments, the first unique identifier is any portion of the data in the first network traffic data unit that is known to be unique. In one or more embodiments, such known unique information may be unique for any period of time. For example, the unique information to be used for the unique identifier may be a tuple of data fields that are known to be unique to a network traffic data unit. As another example, the unique information to be used for the unique identifier may be a tuple of data fields that are known to be unique within a given window of time.

In Step 206, the timestamp generated in Step 202, and the unique identifier created in Step 204 are stored by the first monitoring device as an associated information item corresponding to the network traffic data unit being sent from the first endpoint to the second endpoint at the time of the sending, which may be referred to as a first associated information item. In one or more embodiments, an associated information is a combination of the timestamp at which a network traffic data unit is received at a monitoring device and the unique identifier of the network traffic data unit. In one or more embodiments, the timestamp is a numerical information item that represents a time at any level of time resolution. For example, the timestamp may be a series of binary bits, where the number of bits is sufficient to allow the timestamp to record the time at which the first network traffic data unit was received by the first monitoring device at a sub-nanosecond level. In one or more embodiments, the unique identifier is represented in any form or information representation capable of being used to ascertain the unique identifier. In one or more embodiments, the timestamp and the unique identifier are stored as associated information items in any manner of storing two associated items of information. For example, the timestamp and the unique identifier may be stored as two items of information in a database that are associated with one another. In one or more embodiments, the associated information item including the timestamp and unique identifier of the first network traffic data unit received by the first monitoring device are stored in any storage of the first monitoring device In Step 208, a second associated information item is received by the first monitoring device from a second monitoring device and stored in a manner similar to the storing of the first associated information item discussed above in the description of Step 206, and may also be referred to as a first received associated information item. In one or more embodiments, the second associated information item includes a timestamp representing the time at which the first network traffic data unit was received by the second monitoring device. In one or more embodiments, the first network traffic data unit is received by the second monitoring device via a network tap of a link of a second endpoint that was the destination of the first network traffic data unit transmitted from the first endpoint. In one or more embodiments, the second associated information item also includes the unique identifier of the first network traffic data unit. In one or more embodiments, the second monitoring device creates the unique identifier using the same scheme as was used by the first monitoring device, which leads to the same unique identifier being created by both monitoring devices. Accordingly, the matching unique identifiers allows the first monitoring device to associate the first associated information that the first monitoring device created and stored with the second associated information item received from the second monitoring device to create a first pair of associated information items corresponding to the first network traffic data unit.

In Step 210, a second network traffic data unit is received at the first monitoring device. As discussed above in the description of Step 200, the second network traffic data unit is received via a tap on the link of the first endpoint, which provides a copy of the second network traffic data unit to the first monitoring device. In one or more embodiments, the second network traffic data unit is a network traffic data unit being transmitted by the second endpoint to the first endpoint via the operative connection between the first endpoint and the second endpoint that is tapped at one end by the first monitoring device and at the other end by the second monitoring device.

In Step 212, the first monitoring device generates a timestamp that indicates the time at which the second network traffic data unit arrived at the first monitoring device. In one or more embodiments, the timestamp is a representation of the time as known by the clock device of the first monitoring device. In one or more embodiments, the time is a time as measured from the beginning of an epoch, such as an epoch of Unix time, which may measure the current Universal Coordinated Time (UTC). In one or more embodiments, the resolution of the timestamp is based on the oscillation frequency of an oscillator of the clock device of the first monitoring device. As such, the higher the frequency, the greater the resolution of time that can be obtained. As an example, an oscillator with a high enough frequency may be able to measure time in a sub-nanosecond range. As another example, the oscillators of two or more clocks may be mostly stable, and an average of the arrival time of a network traffic data unit among the oscillators may allow for sub-nanosecond precision.

In Step 214, the first monitoring device creates a second unique identifier using the second network traffic data unit. In one or more embodiments, the second unique identifier is a hash of all or any portion of the data included in the second network traffic data unit. In one or more embodiments, the second unique identifier is any portion of the data in the second network traffic data unit that is known to be unique. In one or more embodiments, such known unique information may be unique for any period of time. For example, the unique information to be used for the unique identifier may be a tuple of data fields that are known to be unique to a network traffic data unit. As another example, the unique information to be used for the unique identifier may be a tuple of data fields that are known to be unique within a given window of time.

In Step 216, the timestamp generated in Step 212, and the unique identifier created in Step 214 are stored by the first monitoring device as a third associated information item. In one or more embodiments, an associated information item is a combination of the timestamp at which a network traffic data unit is received at a monitoring device and the unique identifier of the network traffic data unit. In one or more embodiments, the timestamp is a numerical information item that represents a time at any level of time resolution. For example, the timestamp may be a series of binary bits, where the number of bits is sufficient to allow the timestamp to record the time at which the first network traffic data unit was received by the first monitoring device at a sub-nanosecond level. In one or more embodiments, the unique identifier is represented in any form or information representation capable of being used to uniquely identify the network traffic data unit. In one or more embodiments, the timestamp and the unique identifier are stored as associated information items in any manner of storing two associated items of information. For example, the timestamp and the unique identifier may be stored as two items of information in a database that are associated with one another. In one or more embodiments, the third associated information item including the timestamp and unique identifier of the second network traffic data unit received by the first monitoring device are stored in any storage of the first monitoring device.

In Step 218, a fourth associated information is received by the first monitoring device from a second monitoring device and stored in a manner similar to the storing of the third information item discussed above in the description of Step 216. In one or more embodiments, the fourth associated information item includes a timestamp representing the time at which the second network traffic data unit was received by the second monitoring device after transmission from the second endpoint device towards the first endpoint device. In one or more embodiments, the second network traffic data unit is received by the second monitoring device via a network tap of a link of a second endpoint that was the source of the second network traffic data unit transmitted from the second endpoint. In one or more embodiments, the fourth associated information item also includes the unique identifier of the second network traffic data unit. In one or more embodiments, the first monitoring device creates the unique identifier using the same scheme as was used by the second monitoring device, which leads to the same unique identifier being created by both monitoring devices for the second network traffic data unit. Accordingly, the matching unique identifiers allows the first monitoring device to associate the third associated information that the first monitoring device created and stored with the fourth associated information item received from the second monitoring device to create a second pair of associated information items corresponding to the second network traffic data unit.

In Step 220, the first associated information item, the second associated information item, the third associated information item, and the fourth associated information item are used to calculate a clock offset between the clocks of the first monitoring device and the second monitoring device, and an action is taken based on the aforementioned offset calculation. Details of the offset calculation, and actions that may be taken based thereon, are discussed further in the description of FIG. 2B, below.

Figure 2B:
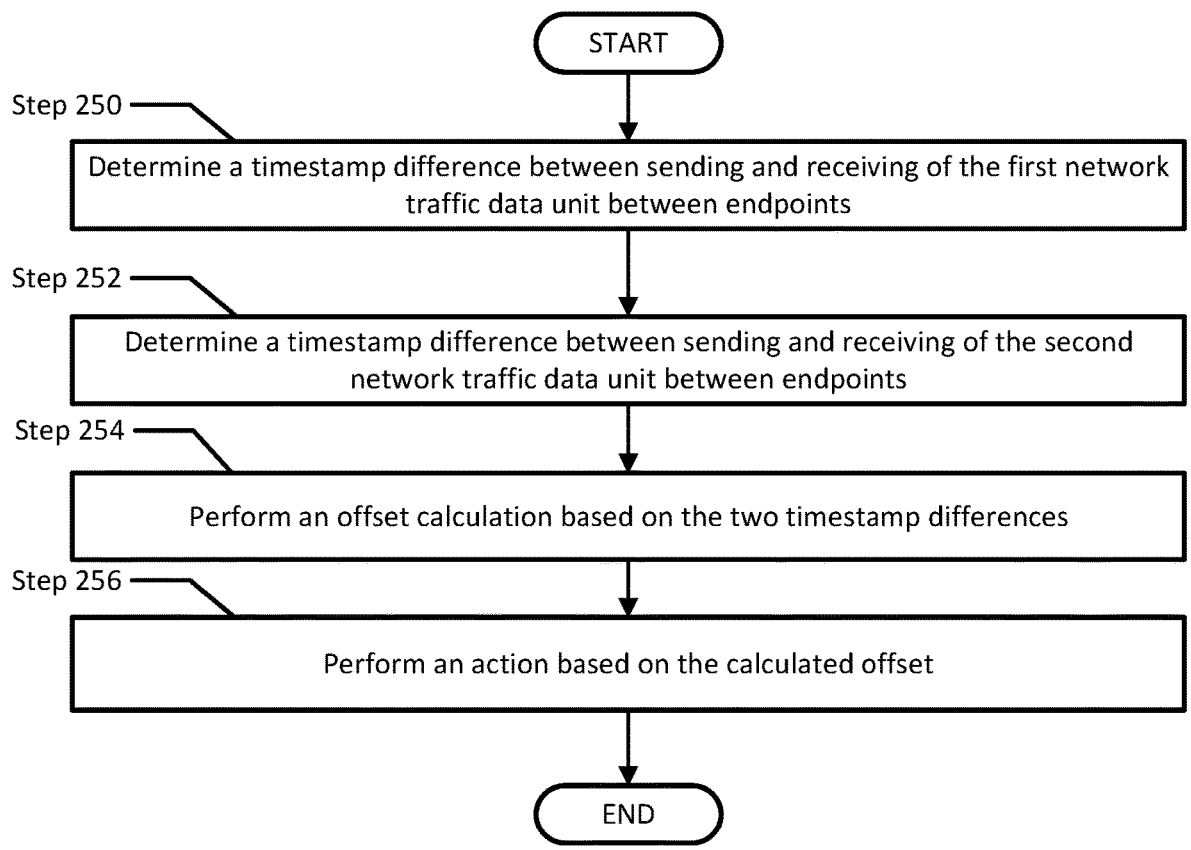
FIG. 2B shows a flowchart in accordance with one or more embodiments described herein.

FIG. 2B shows a flowchart describing a method for performing an offset calculation. The method for such offset calculation shown in FIG. 2B is only one example of a particular scheme for offset calculation. Accordingly, embodiments described herein should not be considered limited to the offset calculation scheme and use shown in FIG. 2B.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, that some or all of the steps may be executed in parallel, that certain steps may be performed closer or farther from one another in time, and/or that other steps than what is shown in FIG. 2B may be performed in accordance with embodiments described herein.

In Step 250, the offset calculation includes determining a first timestamp difference from the time the first network traffic data unit was received by the second monitoring device (i.e., when being received at the second endpoint) and the time the first network traffic data unit was received by the first monitoring device (i.e., when being transmitted from the first endpoint).

In Step 252, the offset calculation includes determining a second timestamp difference from the time the second network traffic data unit was received by the first monitoring device (i.e., when being received at the first endpoint) and the time the second network traffic data unit was received by the second monitoring device (i.e., when being transmitted from the second endpoint).

In Step 254, the second timestamp difference is subtracted from the first timestamp difference and divided by two, thereby yielding the relative offset of the clocks of the first monitoring device and the second monitoring device. In one or more embodiments, the division by two operation accounts for the two separate timestamp differences used in the calculation and assumes that the delay between the endpoints is substantially symmetrical.

In one or more embodiments, the above-described offset calculation assumes that the first network traffic data unit and the second network traffic data unit were communicated at times within a defined time threshold. However, if such an assumption is incorrect, a possibility exists that the clocks of the two monitoring devices may have drifted relative to one another in the time between the exchange of the network traffic data units. In such a scenario, certain additional steps may be taken with regard to potential clock drift.

Specifically, in one or more embodiments, if such an assumption is incorrect, two additional possibilities exist. First, the time difference may be ignored, and the potential error in calculated clock offset may be accepted. Second, if accepting the error is not desired, additional calculation steps may be performed during the offset calculation. For example, the first monitoring device may have a time series database of calculated offsets at certain timestamps known to the first monitoring device. In one or more embodiments, with such a time series database, the first monitoring device may include functionality to perform a statistical analysis (e.g., interpolation, linear regression, etc.) to determine what the timestamps associated with the second network traffic data unit should be for use in the offset calculation. Such timestamps may be referred to as virtual timestamps for the second network traffic data unit, and may be used as described above during the offset calculation by the first monitoring device.

Additionally, as discussed above, in one or more embodiments, the above-described calculation assumes that the delay time from the first monitoring device to the second monitoring device is symmetric with respect to the delay time from the second monitoring device to the first monitoring device. In one or more embodiments, if the delay times are actually asymmetric, the additional steps may be necessary (e.g., calibration based on the known asymmetry) before performing the offset calculation.

In Step 256, an action is taken based on the calculated offset. In one or more embodiments, the action taken based on the calculated offset may be to store the offset and any relevant associated timestamp information. Additionally, or alternatively, the action taken may include adjusting the clock of the first monitoring device and/or the second monitoring device. For example, the second monitoring device may have a clock tracking a GPS clock, and thus may be considered the more accurate clock. In such a scenario, the first monitoring device may adjust the frequency of the oscillator of its clock device higher or lower to move the time closer to that of the second monitoring device. Performing such adjustments in response to a series of offset calculations may cause the clocks of the first monitoring device and the second monitoring device to remain relatively synchronized.

After Step 256, the process ends for a given offset calculation. However, one of ordinary skill in the art will recognize that such calculations will occur over time as network traffic data units are communicated between the first endpoint and the second endpoint. Additionally, although the above-described method sets forth the offset calculation from the perspective of the first monitoring device, a similar process may be performed by the second monitoring device using a similar set of associated information items obtained in a similar manner.

Figure 3:
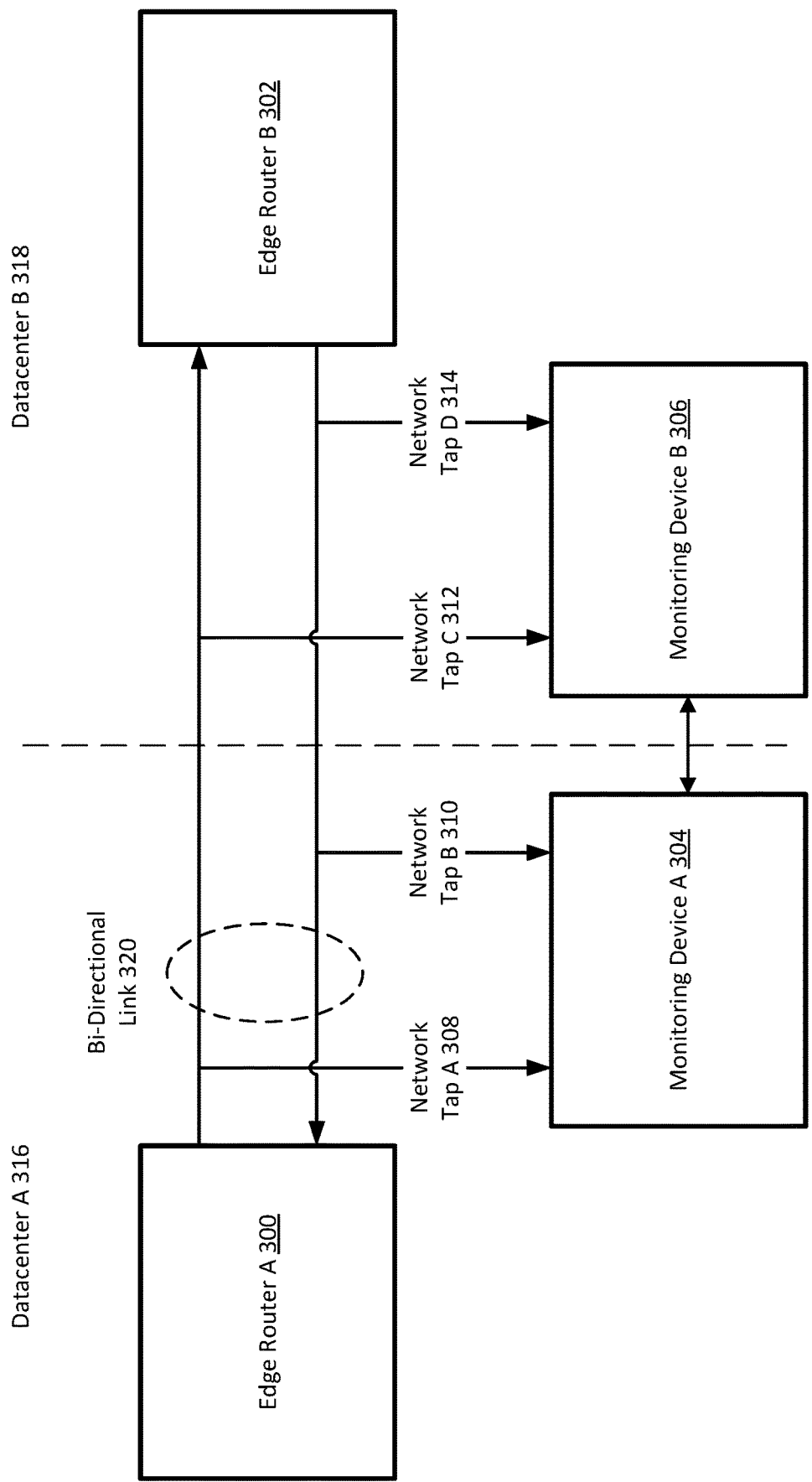
FIG. 3 shows an example in accordance with one or more embodiments described herein.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example. Additionally, for the sake of clarity, timestamps discussed in the below example will be simple one or two digit integers, instead of the many-bit binary numbers that would actually be used, for example, in recording a sub-nanosecond time stamp.

Referring to FIG. 3, consider a scenario in which edge router A (300) and monitoring device A (304) are located in a first datacenter (shown below the dashed line), referred to in FIG. 3 as datacenter A (316). Similarly, edge router B (302) and monitoring device B (306) are located in a second datacenter (shown above the dashed line), referred to in FIG. 3 as datacenter B (318).

In such a scenario, edge router A (300) and edge router B (302) are operatively connected via bidirectional link (320). Monitoring device A (304) has a passive tap on bidirectional link (320) at edge router A (300). Monitoring device B (306) has a passive tap on bidirectional link (320) at edge router B (302).

Figure 4:
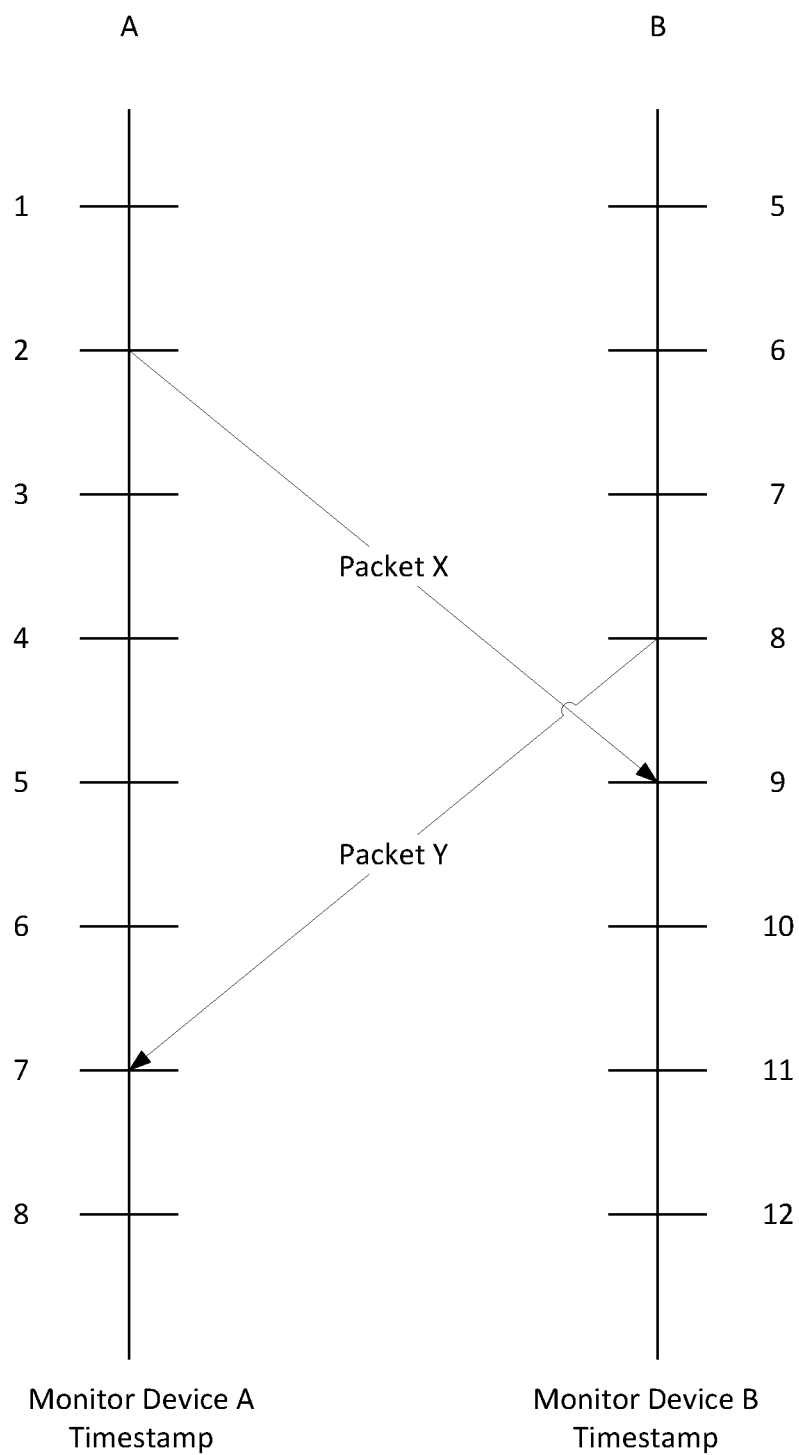
FIG. 4 shows an example in accordance with one or more embodiments described herein.

A graphic representation of the exchange of a packet X and a packet Y between edge routers (300, 302), along with timestamps, may be seen in FIG. 4. The packet exchange is described in greater detail below.

First, a packet X is transmitted with edge router A (300) as the source and edge router B (302) as the destination. Upon transmission from edge router A (300), the passive tap copies packet X and provides it to monitoring device A (304). Monitoring device A (304) generates a timestamp of 2 to record the time of receipt of packet X, and generates a hash of packet X. The timestamp of 2 and the hash of packet X are stored as a first associated information item.

Upon receipt of packet X at edge router B (302), the passive tap copies packet X and provides it to monitoring device B (306). Monitoring device B (306) generates a timestamp of 9 to record the time of receipt of packet X, and generates a hash of packet X. The timestamp of 9 and the hash of packet X are stored as a second associated information item. Monitoring device B (306) then sends the second associated information item over an out of band connection to monitoring device A (304). Monitoring device A (304) stores the second associated information item, and then, based on the hash for the first and second associated information items, further correlates the first and second associated information items as a first pair of associated information items corresponding to packet X.

Next, a packet Y is transmitted with edge router B (302) as the source and edge router A (300) as the destination. Upon transmission from edge router B (302), the passive tap copies packet Y and provides it to monitoring device B (306). Monitoring device B (306) generates a timestamp of 8 to record the time of receipt of packet Y, and generates a hash of packet Y. The timestamp of 8 and the hash of packet Y are stored as a third associated information item. Monitoring device B (306) then transmits the third associated information item to monitoring device A (304) via the out-of-band connection. Monitoring device A (304) then stores the third associated information item.

Upon receipt of packet Y at edge router A (300), the passive tap copies packet Y and provides it to monitoring device A (304). Monitoring device A (304) generates a timestamp of 7 to record the time of receipt of packet Y, and generates a hash of packet Y. The timestamp of 7 and the hash of packet Y are stored as a fourth associated information item. Monitoring device A (304) then, based on the hash for the third and fourth associated information items, further correlates the third and fourth associated information items as a second pair of associated information items corresponding to packet Y.

At this point, monitoring device A (304) has a first pair of associated information items corresponding to packet X, and a second pair of associated information items corresponding to packet Y, with each associated information item including a timestamp.

Next, monitoring device A (304) uses the timestamps of the two pairs of associated information items to solve the following equation:

$$\text{offset} = \frac{1}{2}((XB-XA)-(YA-YB))$$

In the above equation: XB is the timestamp representing the time of the clock of monitoring device B upon receipt of packet X; XA is the timestamp representing the time of the clock of monitoring device A upon receipt of packet X; YA is the timestamp representing the time of the clock of monitoring device A upon receipt of packet Y; and YB is the timestamp representing the time of the clock of monitoring device B upon receipt of packet Y.

Accordingly, the offset calculation is as follows:

$$\text{offset} = \frac{1}{2}((XB-XA)-(YA-YB))$$

$$\text{offset} = \frac{1}{2}((9-2)-(7-8))$$

$$\text{offset} = \frac{1}{2}((7)-(-1))$$

$$\text{offset} = \frac{1}{2}(8)$$

$$\text{offset} = 4$$

Thus, the offset yields that the clock of monitoring device A (304) is 4 units of time behind that of monitoring device B. Therefore, the frequency of the oscillator of monitoring device A needs to be modified in order to mitigate the difference in the times. In one or more embodiments, mitigating the time difference causes the clocks to become synchronized over time. In one or more embodiments, having synchronized times allows a network administrator to assess more accurate latency measurements between events happening between the first datacenter and the second datacenter.

In one or more embodiments, while the offset calculation is described from the perspective of monitoring device A (304), one having ordinary skill in the art will recognize that a similar information storing and exchange may happen that allows monitoring device B (306) to perform a similar offset calculation.

In the above description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While a limited number of embodiments have been described herein, those skilled in the art, having benefit of this disclosure, will appreciate that other embodiments can be devised which do not depart from the scope of the embodiments described herein. Accordingly, the scope of embodiments described herein should be limited only by the attached claims.

What is claimed is:

1. A method for determining an offset between clocks in a network, the method comprising:
    tapping, by a first monitoring device, a first interface of a first endpoint that is operatively connected to a second interface of a second endpoint;
    tapping, by a second monitoring device, the second interface;
    receiving, at the first monitoring device and from the first interface, a first network traffic data unit;
    creating, by the first monitoring device, a first unique identifier using the first network traffic data unit;
    storing, by the first monitoring device; the first unique identifier and a first timestamp indicating a first time at which the first monitoring device received the first network traffic data unit, wherein the first unique identifier and the first timestamp from a first associated information item;
    transmitting, from the first monitoring device to the second monitoring device, the first associated information item;

receiving, at the second monitoring device and from the second interface, the first network traffic data unit;

creating, by the second monitoring device, the first unique identifier using the first network traffic data unit;

storing, by the second monitoring device; the first unique identifier and a second timestamp indicating a second time at which the second monitoring device received the first network traffic data unit, wherein the first unique identifier and the second timestamp from a second associated information item;

transmitting, from the second monitoring device to the first monitoring device, the second associated information item;

receiving, at the second monitoring device and from the second interface, a second network traffic data unit;

creating, by the second monitoring device, a second unique identifier using the second network traffic data unit;

storing, by the second monitoring device; the second unique identifier and a third timestamp indicating a third time at which the second monitoring device received the second network traffic data unit, wherein the second unique identifier and the third timestamp from a third associated information item;

transmitting, from the second monitoring device to the first monitoring device, the third associated information item;

receiving, at the first monitoring device and from the first interface, the second network traffic data unit;

creating, by the first monitoring device, the second unique identifier using the second network traffic data unit;

storing, by the first monitoring device; the second unique identifier and a fourth timestamp indicating a fourth time at which the first monitoring device received the second network traffic data unit, wherein the second unique identifier and the fourth timestamp from a fourth associated information item;

transmitting, from the first monitoring device to the second monitoring device, the fourth associated information item; and performing a calculation using the first associated information item, the second associated information item, the third associated information item, and the fourth associated information item, to determine a time offset between the first monitoring device and the second monitoring device.

2. A monitoring device for determining a clock offset between monitoring devices in a network, the monitoring device comprising:

a clock device comprising circuitry and configured to measure time;

a timestamp device, comprising circuitry, operatively connected to the clock device, and configured to:
  generate a first timestamp corresponding to receipt, from a first endpoint, of a first network traffic data unit at the monitoring device using the clock device; and
  generate a second timestamp corresponding to receipt of a second network traffic data unit, from a second endpoint, at the monitoring device using the clock device;

a unique identifier device comprising circuitry and configured to:
  generate a first unique identifier associated with the first network traffic data unit; and
  generate a second unique identifier associated with the second network traffic data unit;

wherein the monitoring device is configured to:
  generate a first associated information item comprising the first timestamp and the first unique identifier;
  generate a second associated information item comprising the second timestamp and the second unique identifier;
  receive a third associated information item from a second monitor device associated with the receipt of the first network traffic data unit at the second endpoint, the third associated information item comprising a third timestamp and the first unique identifier;
  receive a fourth associated information item from the second monitor device associated with the sending of the second network traffic data unit from the second endpoint, the fourth associated information item comprising a fourth timestamp and the second unique identifier; and an offset calculation device, comprising circuitry, and configured to:
  calculate the clock offset between the first monitoring device and the second monitoring device using the first associated information item, the second associated information item, the third associated information item, and the fourth associated information item; and
  perform an offset action based on the clock offset.

3. The monitoring of claim 2, wherein the monitoring device obtains the first associated information item and the second associated information item using a tap at the first endpoint of an operative connection between the first endpoint and the second endpoint.

4. The monitoring device of claim 2, wherein the monitoring device obtains the third associated information item and the fourth associated information item from the second monitoring device.

5. The monitoring device of claim 2, wherein the offset action comprises adjusting a clock frequency of the monitoring device.

6. The monitoring device of claim 2, wherein the offset action comprises storing the clock offset in an offset database.

7. The monitoring device of claim 2, wherein the first network traffic data unit is sent from the first endpoint operatively connected to the monitoring device to the second endpoint over an operative connection, and the second network traffic data unit is sent from the second endpoint to the first endpoint over the operative connection.

8. The monitoring of claim 7, wherein a symmetric delay time between the first endpoint and the second endpoint exists on the operative connection.

9. The monitoring device of claim 2, wherein the second timestamp is a first virtual timestamp and the fourth timestamp is a second virtual timestamp.

10. The monitoring device of claim 2, further comprising a sampling device, and wherein the first network traffic data unit and the second network traffic data unit are sampled network traffic data units sampled by a sampling device based on a common protocol characteristic.

11. A method for determining a clock offset between monitoring devices in a network, the method comprising:

obtaining, by a first monitoring device, a first set of network traffic data units sent between a first endpoint and a second endpoint via a first tap on a network link between the first endpoint and second endpoint, wherein the first set of network traffic data units comprises a first network traffic data unit when sent from the first endpoint to the second endpoint and a second network traffic data unit when received by the first endpoint from the second endpoint;

obtaining, by a second monitoring device, a second set of network traffic data units sent between the first endpoint and the second endpoint via a second tap on the network link, wherein the second set of network traffic data units comprises the first network traffic data unit when received by the second endpoint from the first endpoint and the second network traffic data unit when sent by the second endpoint to the first endpoint;

calculating the clock offset between the first monitoring device and the second monitoring device using the first set of network traffic data units and the second set of network traffic data units; and performing an offset action based on the clock offset.

12. The method of claim 11, further comprising, before calculating the clock offset:

generating, by the first monitoring device:
- a first associated information item comprising:
  - a first timestamp of a first time at which the first network traffic data unit was received by the first monitoring device; and
  - a first unique identifier of the first network traffic data unit; and
- a second associated information item comprising:
  - a second timestamp of a second time at which the second network traffic data unit was received by the first monitoring device; and
  - a second unique identifier of the second network traffic data unit.

13. The method of claim 12, further comprising, before calculating the clock offset:

receiving, by the first monitoring device from the second monitoring device:
- a third associated information item comprising:
  - a third timestamp of a third time at which the first network traffic data unit was received by the second monitoring device; and
  - the first unique identifier of the first network traffic data unit; and
- a fourth associated information item comprising:
  - a fourth timestamp of a fourth time at which the second network traffic data unit was received by the second monitoring device; and
  - the second unique identifier of the second network traffic data unit.

14. The method of claim 13, further comprising: before calculating the clock offset:

associating, by the first monitoring device and based on the first unique identifier, the first associated information item and the third associated information item to obtain a first associated information item pair; and associating, by the first monitoring device and based on the second unique identifier, the second associated information item and the fourth associated information item to obtain a second associated information item pair.

15. The method of claim 14, wherein calculating the clock offset between the first monitoring device and the second monitoring further comprises using the first associated information item pair and the second associated information item pair.

16. The method of claim 11, wherein the offset action comprises adjusting a clock frequency of the first monitoring device.

17. The method of claim 11, wherein the offset action comprises storing the clock offset in an offset database.

18. The method of claim 11, wherein the first monitoring device is connected to the network link via a first interface comprising the first tap, and the second monitoring device is connected to the network link via a second interface comprising the second tap.

19. The method of claim 11, wherein a symmetric delay time between the first endpoint and the second endpoint exists on the network link.

* * * * *

UNITED STATES PATENT AND TRADEMARK OFFICE
CERTIFICATE OF CORRECTION

PATENT NO. : 11,483,122 B2
APPLICATION NO. : 17/006234
DATED : October 25, 2022
INVENTOR(S) : David C. A. Snowdon and David J. Mirabito It is certified that error appears in the above-identified patent and that said Letters Patent is hereby corrected as shown below:

In the Claims

Column 18, Line 63, "from" should read -- form --

Column 19, Line 9, "from" should read -- form --

Column 19, Line 24, "from" should read -- form --

Column 19, Line 36, "from" should read -- form --

Column 20, Line 8, "monitor" should read -- monitoring --

Column 20, Line 14, "monitor" should read -- monitoring --

Column 20, Lines 21-22, "the first monitoring device" should read -- the monitoring device --

Column 20, Line 28, "The monitoring of claim 2" should read -- The monitoring device of claim 2 --

Column 20, Line 49, "The monitoring of claim 7" should read -- The monitoring device of claim 7 --

Column 20, Line 58, "by a sampling device" should read -- by the sampling device --

Column 20, Line 65, "and second endpoint" should read -- and the second endpoint --

Signed and Sealed this
Eighth Day of August, 2023

Katherine Kelly Vidal
*Director of the United States Patent and Trademark Office*